May 1, 1923.
J. F. O'CONNOR
1,453,693
FRICTION SHOCK ABSORBING MECHANISM
Filed June 13, 1921
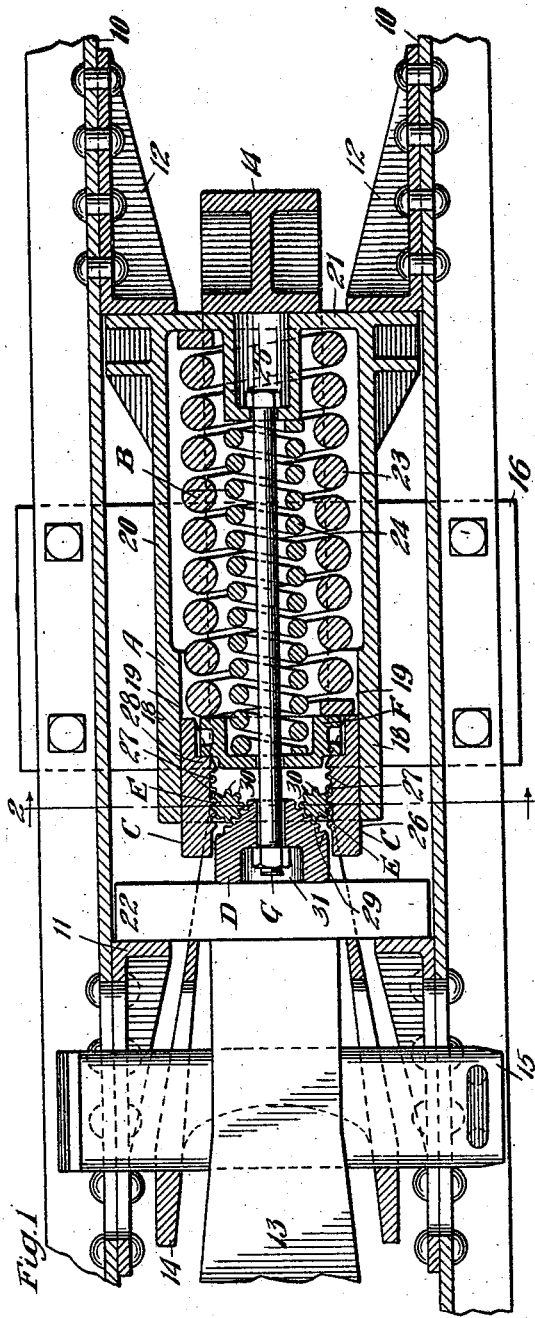
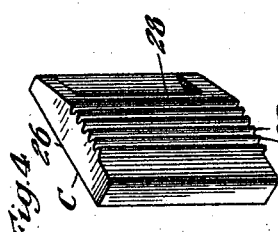
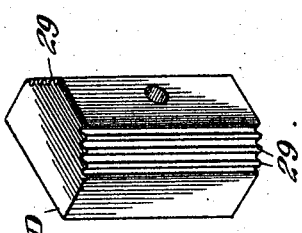
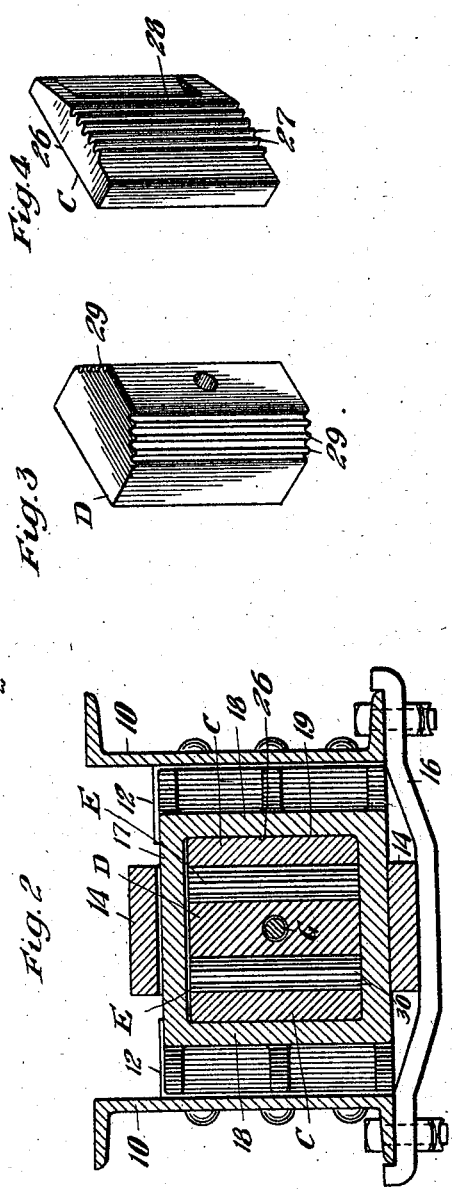
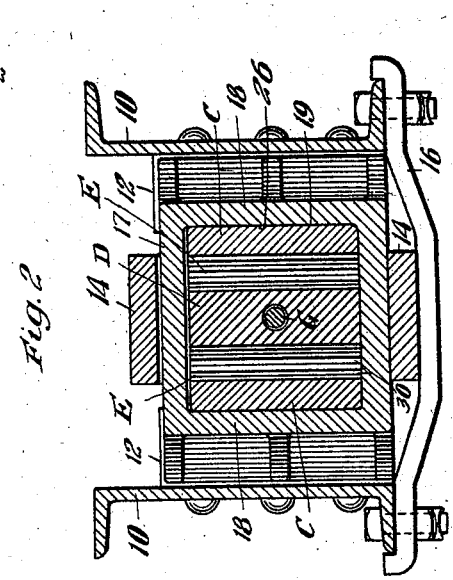
Witnesses
Wm. Geiger
Inventor
John F. O'Connor
By Geo. I. Haight
His Atty.

Patented May 1, 1923.

1,453,693

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed June 13, 1921. Serial No. 476,990.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide an improved friction shock absorbing mechanism especially adapted for railway draft riggings and wherein is employed a novel means of an anti-frictional character for transmitting the load from the wedge-acting member to the friction shoes.

In the drawing forming a part of this specification, Figure 1 is a longitudinal horizontal sectional view of a portion of a railway draft rigging showing my improvements in connection therewith. Figure 2 is a vertical transverse sectional view taken substantially on the line 2—2 of Figure 1. And Figures 3 and 4 are detail perspectives of the pressure-transmitting wedge and one of the friction shoes, respectively.

In the said drawing, 10—10 denote channel draft sills of a railway car, to the inner faces of which are secured front stop lugs 11 and rear stop lugs 12. A portion of a draw-bar is indicated at 13, the same being operatively associated with the shock absorbing mechanism proper by means of a hooded cast yoke 14 and a coupler key 15. The yoke and parts therewithin are supported in operative position by a detachable saddle plate 16.

The improved shock absorbing mechanism proper, as shown, comprises, broadly, a casting A; a spring resistance B; a pair of friction shoes C—C; a pressure-transmitting wedge D; a pair of anti-friction elements E—E; a spring cap or follower F; and a retainer bolt G.

The casting A, as shown, is provided at the forward or outer end thereof with a rectangular box-like friction shell having top and bottom walls 17 and side walls 18—18, the latter being provided on their inner sides with longitudinal flat friction surfaces 19. Rearwardly of the shell proper, the casting A is formed with an integral spring cage 20 having an integral rear vertical wall 21 laterally extended so as to adapt it to act as the rear follower of the draft gear. An ordinary flat front follower 22 is employed, as shown in Figure 1.

The spring resistance B is of ordinary form and preferably consists of an outer heavy coil 23 and an inner lighter nested coil 24. The outer coil bears at its rear end directly against the wall 21 and the inner coil at its rear end bears against an inwardly-extended hollow boss 25. At their forward ends, the coils 23 and 24 bear against the hollow cup-shaped spring cap F.

The friction shoes C, two in number, are of like construction and each is provided on its outer side with a longitudinally-extending flat friction surface 26 adapted to slide upon the adjacent corresponding friction surface 19 of the shell. On its inner side, each shoe C is formed with a series of vertically-extending teeth or ribs 27—27, which may be said to define a rack extending parallel to the center line of the mechanism. The teeth or ribs 27 are formed by alternate convex and concave surfaces so as to provide an anti-friction rolling surface for the element E. Near its inner end each shoe C is formed with a transverse shoulder 28 against which bears the spring cap F.

The pressure-transmitting wedge D is preferably in the form of a casting and is provided with inwardly-converging sides, each of which is formed with a series of vertically-extending teeth or ribs 29—29, which define what may be termed a rack surface extending at an angle to the center line of the mechanism. The size and contour of the teeth 29 coincide with those of the teeth 27.

The anti-friction elements E are of like construction and each is in the form of a fluted roller having a series of longitudinally-extending ribs or teeth 30—30, said ribs being also formed by means of alternated convex and concave surfaces corresponding to those of the teeth 27 and 29.

The retainer bolt G is anchored at its rear end within the hollow boss 25 and extends axially through the spring, through suitable apertures in the spring cap F and wedge D, the forward end being anchored within a recess 31 in the wedge D.

On account of the peculiar formation of the ribs or teeth on the shoes C, wedge D and elements E, I am enabled to obtain relatively large areas of contacting surfaces and this area of contacting surfaces remains substantially constant during any rolling of the elements E with respect to either the shoes C or the wedge D. This is of extreme importance inasmuch as the pressure per unit of area in contact may be maintained at a very much smaller figure than is possible where only true line contacts are employed, assuming equal applied forces. Because of the reduced pressure per unit of area of contact on the rolling elements E, the latter may be manufactured considerably cheaper than the usual true cylindrical rollers and the same is also true of the shoes C and the wedge D.

Another important feature of my invention, which will be clear from an inspection of Figure 1, resides in the fact that, by means of the elements E, I am enabled to convert the wedging force transmitted from the wedge D to the elements E in outwardly directed lines perpendicular to the sloping faces of the wedge D into lines of force directed perpendicular to the shoes C, so that the latter will have no tendency to tilt, but, on the contrary, will be pressed outwardly substantially uniformly from end to end. This result holds good regardless of any inward movement of the wedge D with respect to the shoes C.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a spring resistance; friction shoes cooperable with said shell; a pressure transmitting wedge; and rollers having ribs, interposed between said wedge and shoes, said wedge and shoes having faces provided with ribs co-operable with the first named ribs, said faces of said wedges and shoes diverging uniformly from end to end.

2. In a friction shock absorbing mechanism, the combination with a friction shell; of a spring resistance; friction shoes cooperable with said shell, each shoe having an inner toothed face extending in a general plane parallel to the outer friction surface thereof; a wedge having faces converging inwardly toward the center line of the mechanism, said faces being correspondingly toothed; a longitudinally ribbed rolling element interposed between, and co-operable with, each set of correspondingly ribbed wedge and shoe faces; and a spring resistance.

3. In a friction shock absorbing mechanism, the combination with a friction shell; of a spring resistance; friction shoes cooperable with said shell; a pressure transmitting wedge; and rollers ribbed longitudinally, interposed between said wedge and shoes, said wedge and shoes having opposed correspondingly ribbed faces co-operable therewith, said opposed faces diverging from end to end, and all of said ribbed faces of the shoes, rollers and wedge being formed by alternate convex and concave surfaces.

4. In a friction shock absorbing mechanism, the combination with a friction shell, of a spring resistance; friction shoes cooperable with said shell, each shoe having an inner toothed face extending in a general plane parallel to the outer friction surface thereof; a wedge having faces converging inwardly toward the center line of the mechanism, said faces being correspondingly toothed, a longitudinally ribbed rolling element interposed between, and co-operable with each set of corresponding ribbed wedge and shoe faces, all of the ribbed faces of the shoes, rolling elements and wedge being formed by alternate convex and concave surfaces; and a spring resistance.

5. In a friction shock absorbing mechanism; the combination with a friction shell; of a spring resistance; friction shoes co-operable with said shell; a pressure transmitting wedge, said wedge and shoes having opposed diverging faces, each provided with transversely arranged ribs; and rollers having radially projecting ribs, said rollers being interposed between said wedge and shoes, said ribs on said opposed diverging faces engaging with ribs located on the same side with reference to a diameter of each of said rolls.

In witness that I claim the foregoing I have hereunto subscribed my name this 9th day of June, 1921.

JOHN F. O'CONNOR.

Witnesses:
 CARRIE GAILING,
 ANN BAKER.